United States Patent
Lee et al.

(10) Patent No.: US 7,885,026 B2
(45) Date of Patent: Feb. 8, 2011

(54) MAGNETIC RECORDING MEDIUM AND METHOD OF FABRICATING THE SAME

(75) Inventors: Hoo-san Lee, Osan-si (KR); Hoon-sang Oh, Seongnam-si (KR); Sung-hoon Choa, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 12/018,430

(22) Filed: Jan. 23, 2008

(65) Prior Publication Data

US 2009/0002875 A1    Jan. 1, 2009

(30) Foreign Application Priority Data

Jun. 29, 2007    (KR) .................... 10-2007-0065686

(51) Int. Cl.
G11B 5/09    (2006.01)
(52) U.S. Cl. ........................... 360/48; 360/135
(58) Field of Classification Search ................ None
See application file for complete search history.

(56) References Cited

U.S. PATENT DOCUMENTS 7,164,548 B2 *   1/2007  Hattori et al. ................. 360/48
7,417,826 B2 *   8/2008  Hattori et al. ................ 360/135
7,561,360 B2 *   7/2009  Kamimura et al. ............ 360/48
2006/0279871 A1  12/2006  Albrecht et al.

FOREIGN PATENT DOCUMENTS

EP    1596390 A2 *  11/2005

* cited by examiner

*Primary Examiner*—Jason C Olson
(74) *Attorney, Agent, or Firm*—Sughrue Mion, PLLC (57) ABSTRACT

A magnetic recording medium and a method of fabricating the same are provided. The magnetic recording medium in which a position for magnetic recording is patterned with a magnetic material, includes a magnetic recording layer which includes a data area having a plurality of data tracks, and a servo area having a servo burst for following the data tracks, wherein the servo burst includes a plurality of bursts disposed in a zigzag structure along a downtrack direction, and each of the bursts includes a plurality of burst pieces having different coercivities from each other. The magnetic recording medium is subjected to two servo-recording processes, so that a signal similar to an alternative signal written in a burst having a burst pattern used in a related art continuous medium can be obtained.

24 Claims, 8 Drawing Sheets

FIG. 12

MAGNETIC RECORDING MEDIUM AND METHOD OF FABRICATING THE SAME

CROSS-REFERENCE TO RELATED PATENT APPLICATIONS

This application claims priority from Korean Patent Application No. 10-2007-0065686, filed on Jun. 29, 2007, in the Korean Intellectual Property Office, the disclosure of which is incorporated herein in its entirety by reference.

BACKGROUND OF THE INVENTION

1. Field of the Invention

Apparatus and methods consistent with the present invention relate to magnetic recording mediums and fabricating the same, and more particularly, to magnetic recording mediums having a burst pattern, suitable for a medium in which a position for magnetic recording is patterned with a magnetic material in a fabrication stage, such as a discrete track medium or a patterned medium.

2. Description of the Related Art

As the amount of information processed substantially increases, demands for information storage devices enabling recording/reproducing of data at higher densities are growing. Specifically, hard disk drives using a magnetic recording medium are desirable as an information storage device for a computer and various digital devices, since they have large capacities and high-speed access characteristics. In the case of a magnetic recording medium having a continuous magnetic recording layer (hereinafter, referred to as a continuous medium), when the size of a bit, which is the smallest unit of data, or the pitch width of a data track are reduced to a predetermined size, more noise occurs due to influence of adjacent areas and recording stability is substantially decreased. Thus, there is a limit in increasing a recording density by increasing a linear recording density (BPI) which is a density in a direction in which a disk rotates, or a track density (TPI) which is a density in a radius direction of the disk.

As such, research into a medium in which a position for magnetic recording is patterned with a magnetic material in its fabrication stage, such as a discrete track medium or a patterned medium is being performed. A discrete track medium has a magnetic recording layer which is patterned with a plurality annulus shaped data tracks in its fabrication stage. A patterned medium has a magnetic recording layer which is patterned with a plurality of island-like shaped bit dots in its fabrication stage. At this time, a separation area between the data tracks or bit dots can be empty or filled with a nonmagnetic material. In the case of a discrete track medium or a patterned medium, a position for magnetic recording is isolated magnetically, and thus, the density of data tracks can be increased and data can be recorded at a high density.

Meanwhile, in a magnetic recording medium, servo information required to position a magnetic head at a desired location on the magnetic recording medium should be recorded before a user's data is written. In the case of the discrete track medium or the patterned medium, a servo pattern containing the servo information can be formed together with a data track or bit dot which is patterned in a process of fabricating the magnetic recording medium. This method is known as a pre-embedded servo method.

However, the related art pre-embedded servo method has a problem that it is difficult to accurately adjust a magnetization direction in respective servo patterns. As for the perpendicular magnetic recording, a magnetic signal is determined according to a magnetization direction in a medium, that is, whether the magnetization direction is an upward direction or a downward direction. When a servo pattern is formed together with a data track or bit dot, it is difficult to accurately adjust the magnetization direction of the servo pattern in an upward direction or a downward direction. For example, when a servo pattern is formed and then an Alternating Current (AC) erase is performed, many domains having up/down magnetization directions can exist in respective servo patterns, and thus signals from respective servo patterns are too small and a degree of precision of a servo can be decreased. When a servo pattern is formed and then a Direct Current (DC) erase is performed, magnetization directions of all the bits are the same and thus the signal acts as a DC signal, which is not desirable to for processing the signal. In addition, when magnetization directions of all the bits are the same, bits may be thermally unstable.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a magnetic recording medium in which a position for magnetic recording is patterned with a magnetic material, the magnetic recording medium including a magnetic recording layer which includes a data area having a plurality of data tracks and a servo area having a servo burst for following data tracks, wherein the servo burst comprises a plurality of bursts disposed in a zigzag structure along a downtrack direction, and each of the bursts comprises a plurality of burst pieces having different coercivities from each other.

According to another aspect of the present invention, there is provided method of fabricating a magnetic recording medium in which a plurality of data tracks and a servo burst for following each of the data track are embedded in a magnetic recording layer, the method including: patterning the magnetic recording layer to form a location to be magnetically recorded, thereby forming a plurality of data tracks; patterning bursts each having a plurality of burst pieces having different coercivities from each other in the magnetic recording layer such that the bursts are disposed in a zigzag structure along a downtrack direction; applying a first magnetic field to the servo burst so that all of the burst pieces of the servo burst are magnetized in a first direction, the first magnetic field having a stronger intensity than coercivities of the burst pieces; and applying a second magnetic field to the servo burst which has been magnetized in the first direction, in a second direction, the second magnetic field having a weaker intensity than coercivities of first burst pieces among the plurality of burst pieces but having a stronger intensity than coercivities of second burst pieces among the plurality of burst pieces, wherein the burst pieces having smaller coercivity than the intensity of the second magnetic field are magnetized in the second direction.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. In the drawings, like reference numerals in the drawings denote like elements and the sizes of respective composing elements are exaggerated for clarity and convenience.

Figure 1:
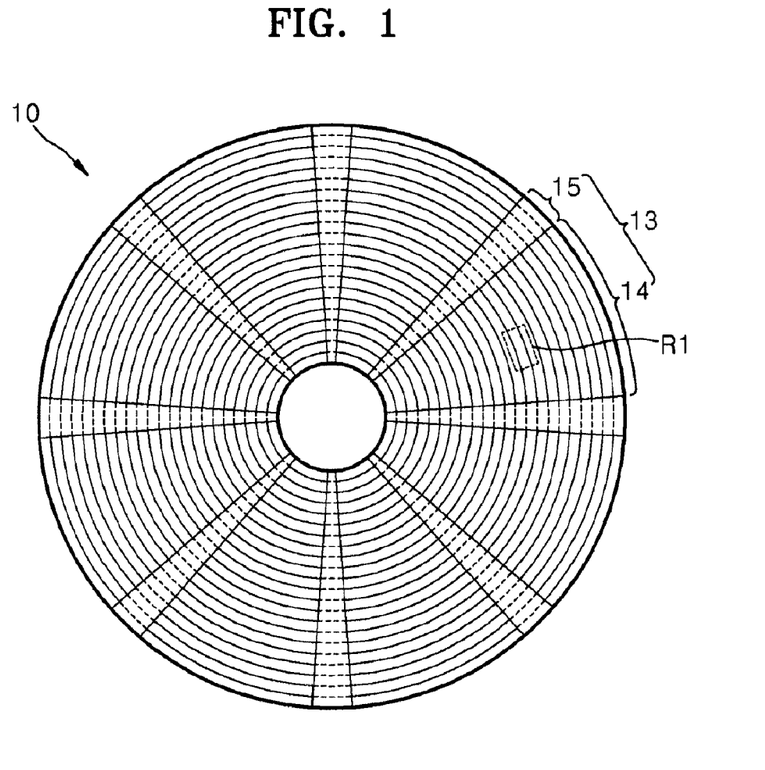
FIG. 1 is a schematic view of a magnetic recording medium according to an exemplary embodiment of the present invention.
Figure 2:
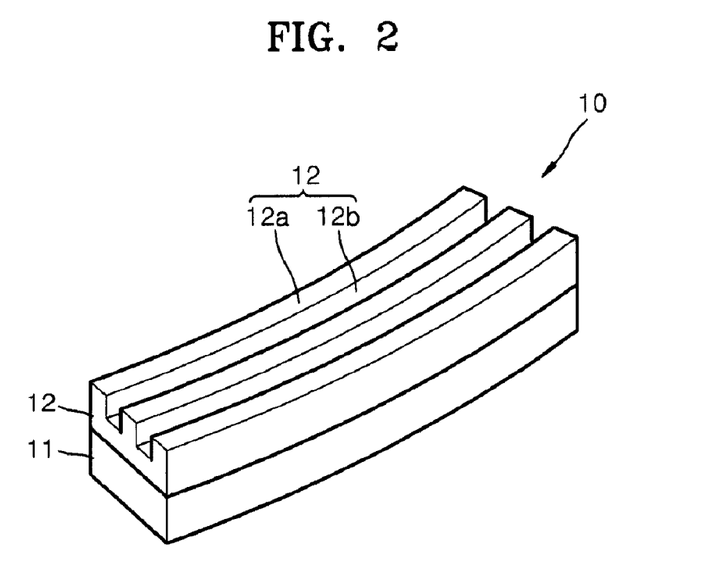
FIG. 2 is a sectional perspective view of a portion R1 of FIG. 1.

FIG. 1 is a schematic view of a magnetic recording medium 10 according to an exemplary embodiment of the present invention, and FIG. 2 is an enlarged, sectional perspective view of a portion R1 of FIG. 1 in order to schematically illustrate a physical structure of a magnetic recording medium.

Referring to FIG. 1 and FIG. 2, the magnetic recording medium 10 includes a magnetic recording layer 12 formed on at least one surface of a disk-shaped substrate 11. The magnetic recording layer 12 is patterned to have a protrusion 12a which is formed of a magnetic material, and a groove 12b which magnetically separates adjacent protrusions 12a from each other, as illustrated in FIG. 2. As a result, a position for magnetic recording is determined in a fabrication stage. The protrusion 12a can be a data track or a burst pattern, which will be described later. The groove 12b is a separation area for separating magnetically the data track or the burst pattern, and can be empty or filled with a nonmagnetic material.

A magnetic recording surface of the magnetic recording medium 10 may be divided into a plurality of sectors 13, and each of the sectors 13 includes a data area 14 and a servo area 15. According to the current exemplary embodiment, the servo areas 15 are provided in each sectors 13, each servo area 15 forming a wedge shape. However, the position or the shape of the servo areas 15 is not limited thereto. For example, the servo area 15 can be formed occupying a predetermined width in a radius direction of the disk to have an annulus shape.

The data area 14 includes data tracks 16 (refer to FIG. 3) which are protrusions formed of a magnetic material and in which data is recorded, and a separation area 17 (refer to FIG. 3) which magnetically isolates adjacent data tracks 16. The data tracks 16, magnetically isolated in a radius direction of the disk-shaped substrate 11, are formed of a magnetic material, and are continuous in the downtrack direction. The downtrack direction refers to a direction in which the data tracks 16 extend. The width of the data tracks 16 can be in the range from a few nm to tens nm. As described above, the magnetic recording medium 10 according to the current exemplary embodiment is a discrete track medium having a high recording density obtained by patterning the data track 16 such that a magnetic effect between data tracks 16 can be minimized.

A servo information which is required to record/reproduce data in the magnetic recording medium 10 using a magnetic head is recorded in a servo pattern in the servo area 15.

Figure 3:
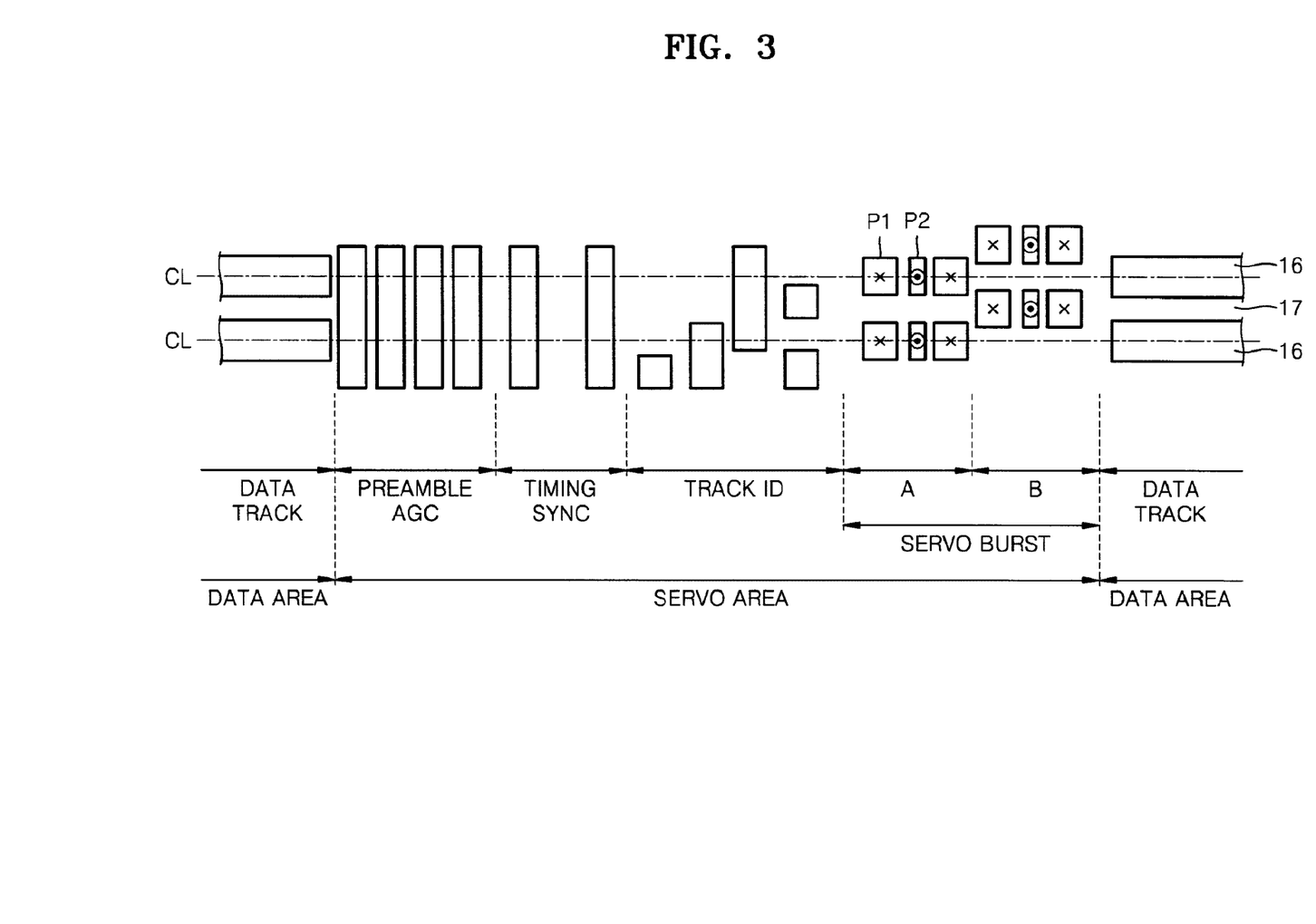
FIG. 3 is a schematic view of an example of a servo pattern formed in a servo area of the magnetic recording medium of FIG. 1.

FIG. 3 is a schematic view of an example of a servo pattern formed in a servo area of the magnetic recording medium. Referring to FIG. 3, the magnetic recording surface of the magnetic recording medium 10 according to the current exemplary embodiment is divided into a data area and a servo area. The data area includes a plurality of data tracks 16 and a plurality separation areas 17 which separate the data tracks 16 from each other.

Servo information which includes pre burst information and a servo burst is written in the servo area. The servo information can be written in an embedded servo pattern. That is, the servo information can be patterned together with the data tracks 16 of a data area when the magnetic recording medium 10 is fabricated. The pre burst information can include at least one selected from the group consisting of a preamble auto gain control (AGC), a timing sync, and a track ID. The preamble AGC provides a gap in an initial portion of the servo area to determine gains through a predetermined timing margin or adjustment of gains. The timing sync provides information for the starting of the servo area. The track ID provides track information. Besides, the pre burst information can further include one rotation information of the disk or sector information.

The servo burst refers to information allowing a magnetic head to appropriately follow the data track in the magnetic recording medium 10. The servo burst includes a A burst in an area A and a B burst in area B.

The A burst is disposed on a center line CL of the data tracks 16, and the B burst is disposed a distance which is half of a track pitch from the A burst in a crosstrack direction. The crosstrack direction refers to a direction perpendicular to the downtrack direction. Each of the A burst and the B burst includes a plurality of burst pieces including first and second burst pieces P1 and P2, wherein the first and second burst pieces P1 and P2 have different sizes from each other. The first burst piece P1 is larger than the second burst piece P2 in size. The magnetization direction of the first burst piece P1 is opposite to the magnetization direction of the second burst piece P2. Such a structure in which a magnetization direction varies according to the size of first and second burst pieces is based on a phenomenon that a coercivity of the magnetic material is changed according to its size.

The burst pattern illustrated in FIG. 3 is simplified to easily illustrate the drawing. In FIG. 3, each of the A burst and the B burst includes three burst pieces. However, structures of the A burst and the B burst are not limited. For example, each of the burst A and the burst B can include more than three burst pieces. Each burst piece is magnetized in an upward direction or in a downward direction. As described above, respective burst pieces can have different bit lengths and different magnetization directions from each other. Thus, the A burst and the B burst each including such burst pieces can produce a signal similar to an alternative signal written in a burst of a burst pattern used in a related art continuous medium.

Meanwhile, according to the current exemplary embodiment, each burst includes two kinds of burst pieces having different sizes from each other. However, the structure of each burst is not limited thereto. For example, each burst can include many various-sized burst pieces, since the burst can be any burst that includes some burst pieces having coercivities weaker than a predetermined coercivity and other burst pieces having coercivities stronger than the predetermined coercivity.

With reference to FIGS. 4, 5A, 5B, and 5C, a phenomenon that a magnetic material has a varying coercivity according to its size will be described in detail.

Figure 4:
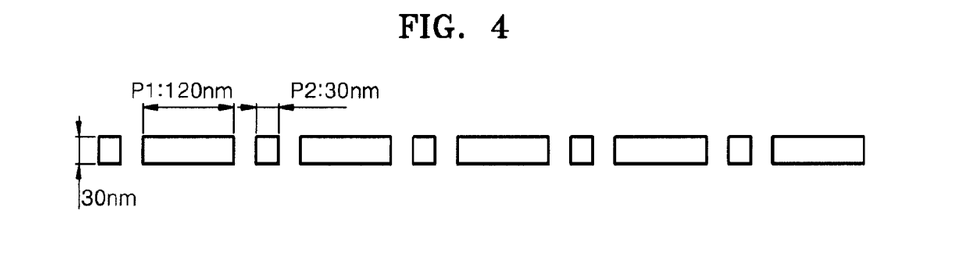
FIG. 4 is a view of an example of a burst pattern.

FIG. 4 shows an example of a burst pattern. The width of each of the burst pieces in a crosstrack direction is 30 nm, and the length of each of the burst piece in a downtrack direction is 120 nm (first burst piece; P1) and 30 nm (second burst piece; P2). Meanwhile, the magnetic material has a saturated magnetization (Ms) of 400 emu/cm$^3$, and a magnetic anisotropy energy K of $1 \times 10^6$ erg/cm$^3$.

Figure 5A:
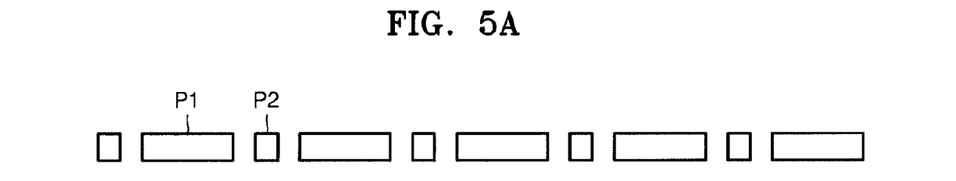
FIGS. 5A through 5C illustrate results of simulation showing the magnetized state of respective burst pieces according to a magnetic field applied from the outside.
Figure 5B:
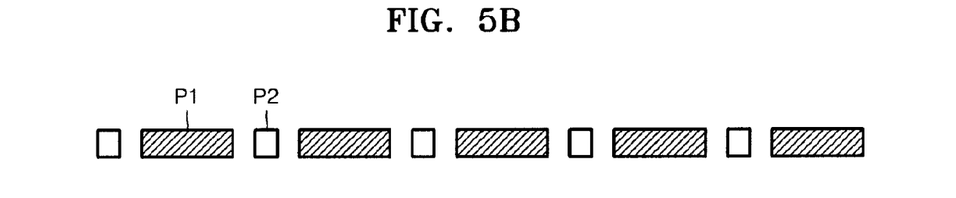
Figure 5C:
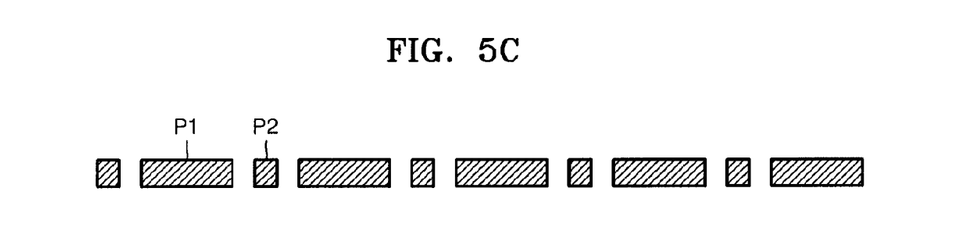

FIGS. 5A, 5B, and 5C illustrate a magnetized state of the burst pattern of FIG. 4 when a magnetic field is externally applied. FIG. 5A illustrates a magnetized state of the burst pattern when a magnetic field of 10,000 Oe is externally applied in a first direction. As illustrated in FIG. 5A, all the burst pieces are magnetized in one direction initially. Meanwhile, as the intensity of the external magnetic field is gradually increased in the opposite direction to the first direction, the magnetization direction of only the first burst piece P1 is changed as illustrated in FIG. 5B. At this time, the intensity of the external magnetic field is 5,900 Oe, from which it can be found that the coercivity of the first burst piece P1 is 5,900 Oe. When the intensity of the external magnetic field is increased to 8,100 Oe, the magnetization direction of the second burst piece P2 is also changed. That is, the coercivity of the second burst piece P2 is 8,100 Oe.

Referring to FIG. 5A through FIG. 5C, the first burst piece P1 formed of a large-sized magnetic material shows a magnetization reversal at about −6000 Oe, and the second burst piece P2 formed of a small-sized magnetic material shows a magnetization reversal at −8000 Oe. That is, the difference between the coercivity of the magnetic material forming the first burst piece P1 and the coercivity of the magnetic material forming the first burst piece P2 is about 2,000 Oe. Accordingly, when a magnetic field having a magnetic field intensity of about 7000 Oe is applied to the large and small-sized magnetic materials in the opposite direction of a magnetization vector direction that has been applied, the magnetic material forming the first burst piece P1 shows a magnetization reversal, but the magnetic material forming the second burst piece P2 does not show a magnetization reversal and maintains its original state. As such, due to the difference between coercivities of magnetic materials, magnetization directions of the first and second burst pieces can be controlled.

According to the current exemplary embodiment, the burst pattern includes two kinds of burst pieces having different sizes from each other. However, the structure of the burst pattern is not limited thereto. For example, even in the case that the burst pattern includes more than two burst pieces having different coercivities from each other, when a magnetic field having a predetermined intensity is applied, some burst pieces having a coercivity weaker than the intensity of the applied magnetic field are magnetized, and other burst pieces having a coercivity stronger than the intensity of the applied magnetic field are not magnetized. Accordingly, even when each burst includes burst pieces having various sizes, the method described above can also be used.

A method of fabricating the magnetic recording medium according to the current exemplary embodiment will now be described in detail.

First, an area to be magnetically recorded is patterned in a magnetic recording layer so that a plurality of data tracks and a servo burst pattern are formed in a magnetic recording medium. At this time, data tracks are magnetically isolated in a direction perpendicular to a downtrack direction as illustrated in FIGS. 1 and 2; each data track is continuous in the downtrack direction and is formed of a magnetic material. The servo burst, as illustrated in FIG. 3, can be patterned in a magnetic recording layer such that bursts are disposed in a zigzag structure along the downtrack direction. The data tracks and the servo burst pattern can be formed at the same time, and thus, a process of forming the servo burst pattern according to the current exemplary embodiment may not make the method of fabricating a magnetic recording medium complex. The data track and the servo burst pattern can be formed using an E-beam lithography process, a nano imprint lithography process, or the like. The E-beam lithography process and a nano imprint lithography process are well known to those of ordinary skilled in the art, and thus will not be described in detail.

According to the current exemplary embodiment, coercivities of burst pieces are controlled by adjusting a length of each burst piece in the downtrack direction. However, coercivities of burst pieces can also be controlled by adjusting a width of each burst piece in a crosstrack direction.

Figure 6:
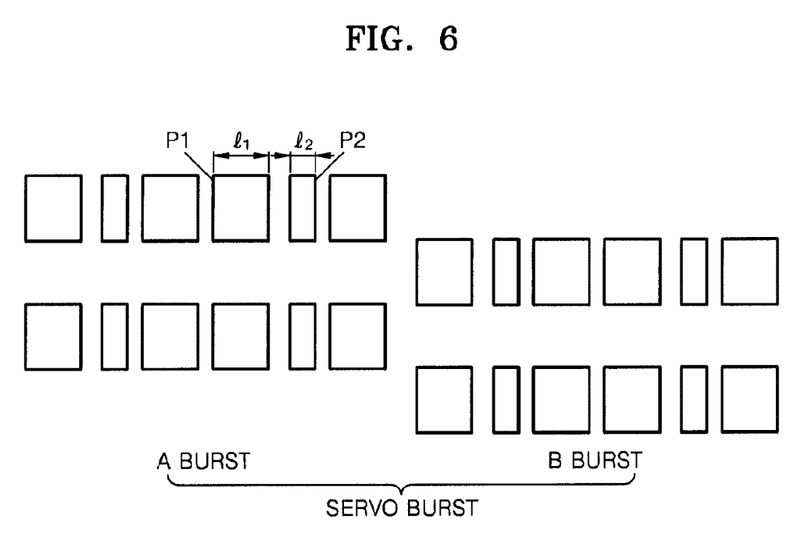
FIGS. 6 through 8 illustrate a method of controlling a servo signal of an embedded servo burst.
Figure 7:
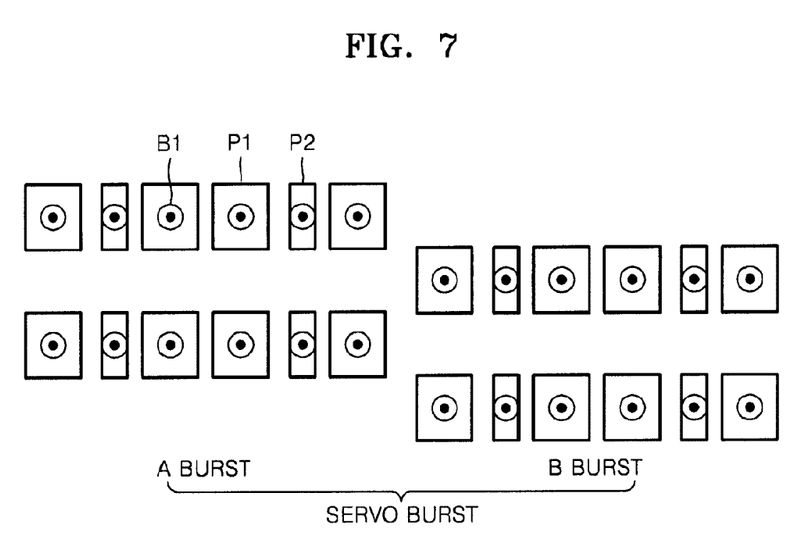
Figure 8:
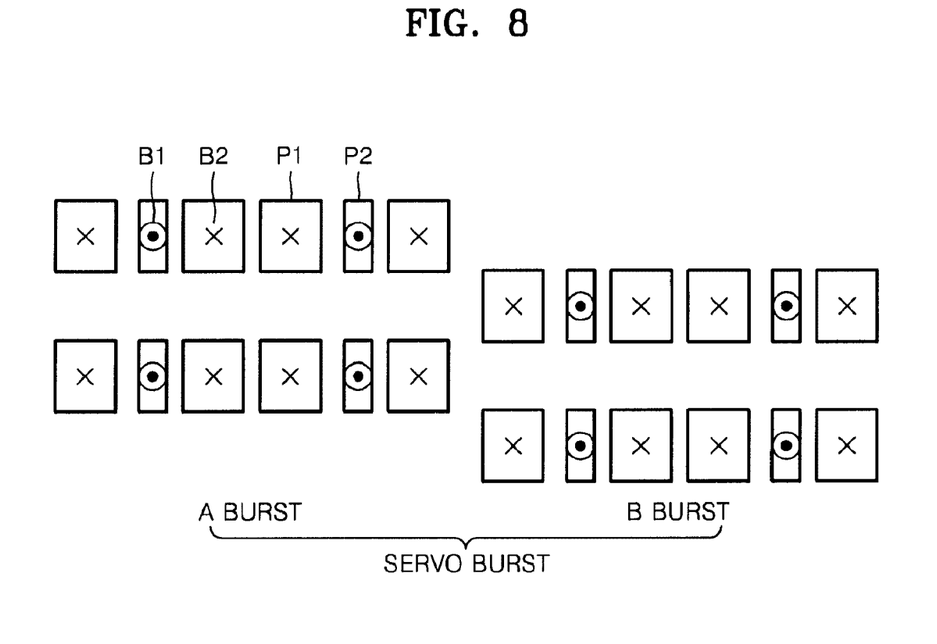

With reference to FIGS. 6 through 8, a method of controlling a servo signal of an embedded servo burst will now be described in detail. FIGS. 6 through 8 illustrate only a servo burst in order to describe a type of the servo burst and a recording method therefor.

Referring to FIG. 6, each of a burst A and a burst B includes a plurality of first burst pieces P1 having a length of $l_1$ in the downtrack direction and a plurality of second burst pieces P2 having a length of $l_2$ in the downtrack direction, in which $l_1$ is larger than $l_2$, and widths of the first and second burst pieces P1 and P2 in a crosstrack direction are the same each other. $l_1$ is larger than $l_2$, the first burst piece P1 is larger than the second burst piece P2 in size, and thus, the first burst piece P1 has smaller coercivity than the second burst piece P2. For ease of description, the coercivity of the first burst piece P1 is set to 5000 Oe, and the coercivity of the second burst piece P2 is set to 8000 Oe.

When a magnetic field of 10000 Oe is applied to such a magnetic recording medium in an upward direction, as illustrated in FIG. 7, the first and second burst pieces P1 and P2 are magnetized in an upward direction (B1). Then, when a magnetic field of 6500 Oe is applied to the magnetic recording medium in a downward direction, only first burst pieces P1 having a coercivity smaller than 6500 Oe show a magnetization reversal and are magnetized in a downward direction (B2), but the second burst pieces P2 maintain magnetized in an upward direction (B1). As a result, a servo burst pattern having magnetization directions as illustrated in FIG. 8 is formed.

As such, through two magnetizing processes, burst pieces having different sizes from each other can be magnetized in opposite directions to each other, and thus, a desired alternating signal can be recorded in the servo burst.

Then, a magnetic recording medium according to another exemplary embodiment of the present invention will now be described in detail with reference to FIGS. 9 through 11.

Figure 9:
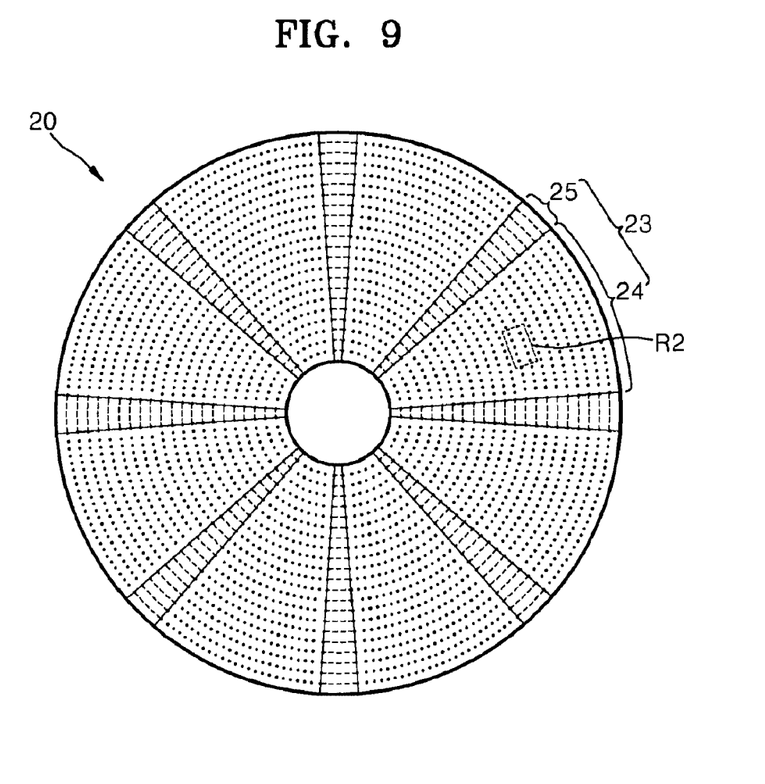
FIG. 9 is a schematic view of a magnetic recording medium according to another exemplary embodiment of the present invention.
Figure 10:
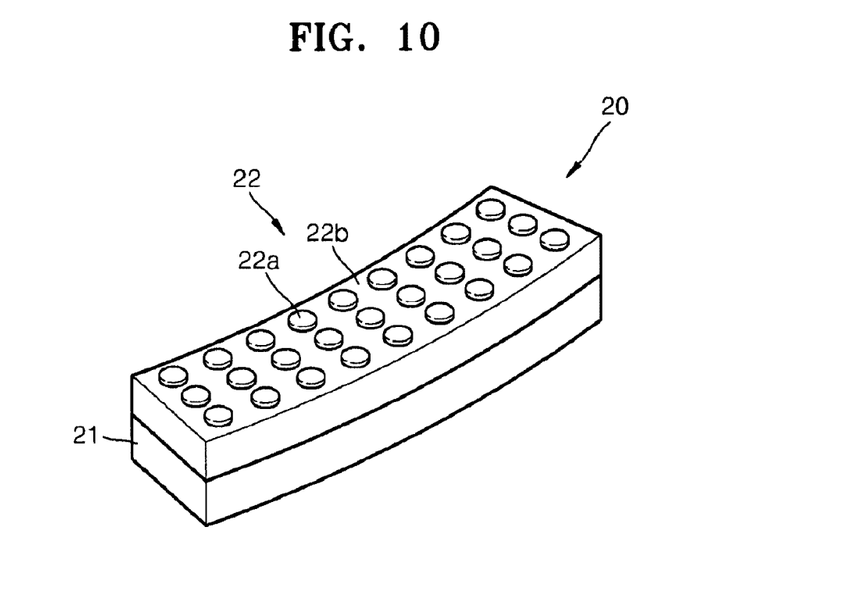
FIG. 10 is a sectional perspective view of a portion R2 of FIG. 9.

FIG. 9 is a schematic view of a magnetic recording medium 20 according to another exemplary embodiment of the present invention, and FIG. 10 is an enlarged sectional perspective view of a portion R2 of FIG. 9. FIG. 11 is a schematic view of an example of a servo pattern formed in a servo area of the magnetic recording medium of FIG. 9. The magnetic recording medium according to the current exemplary embodiment is a patterned medium and is substantially the same as the magnetic recording medium described according to the previous embodiment, except that the magnetic recording layer is patterned to have bit dots, which will be described later. Accordingly, the description of elements in the current embodiment similar to the elements in the previous exemplary embodiment will not be described and the difference between the previous and current embodiments will be described.

Referring to FIGS. 9 and 10, the magnetic recording medium 20 includes a magnetic recording layer 22 formed on at least one surface of a disk-shaped substrate 21. The magnetic recording layer 22 is patterned to have protrusions 22a which are formed of a magnetic material, and grooves 22b which magnetically separate adjacent protrusions 22a from each other, as illustrated in FIG. 10. As a result, an area to be magnetically recorded is determined in the fabrication stage. The protrusions 22a are formed of a plurality of non-continuous magnetic bodies which are magnetically separated in a crosstrack direction and a downtrack direction. Each protrusion 22a can be patterned to be a minimum unit for magnetic recording, that is, to each be a bit dot to which one bit assigned. Each protrusion 22a may have a diameter from about a few nm to tens nm. The grooves 22b are isolate magnetically the bit dots from one another. The grooves 12b can be empty or filled with a nonmagnetic material. The array of bit dots forms a data track (26 of FIG. 11) and corresponds to the data track of a discrete track medium described above.

A magnetic recording surface of the magnetic recording medium 20 is divided into a plurality of sectors 23 equiangularly separated, and each sector 23 includes a data area 24 and a servo area 25. According to the current embodiment, the servo areas 25 are provided in each sector 23, each servo area 25 forming a wedge shape. However, the position and shape of the servo areas 25 is not limited thereto. For example, the servo area 25 can be formed occupying a predetermined width in the radius direction of the magnetic recording medium 20 to have an annulus shape.

Figure 11:
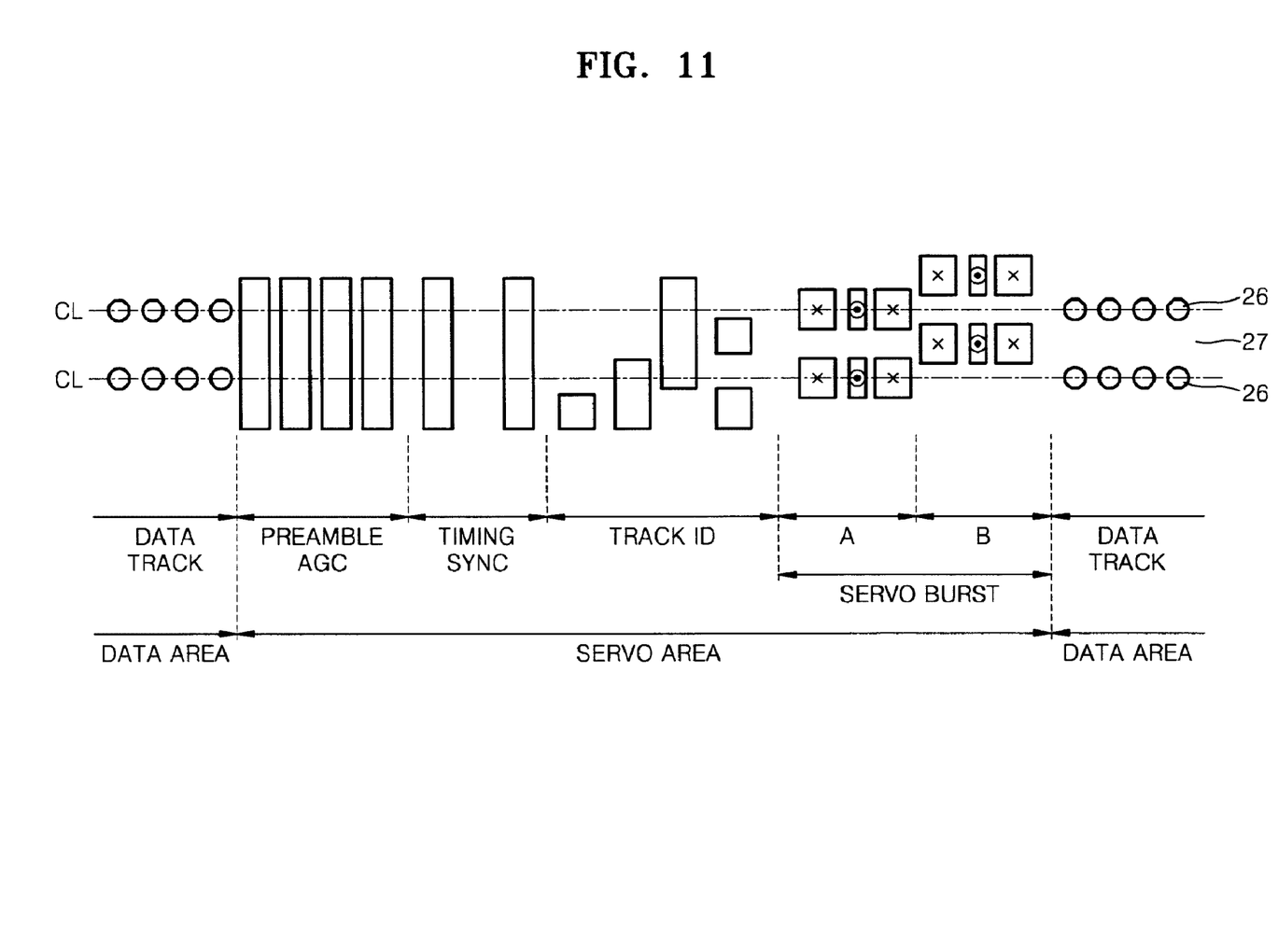
FIG. 11 is a schematic view of an example of a servo pattern formed in a servo area of the magnetic recording medium of FIG. 9.

Referring to FIG. 11, servo information which includes pre burst information and a servo burst is written in the servo area. The servo information can be written in an embedded servo pattern. That is, the servo information can be patterned together with the data tracks 26 of a data area when the magnetic recording medium 20 is fabricated. The pre burst information can include at least one selected from the group consisting of a preamble auto gain control (AGC), a timing sync, and a track ID.

The servo burst refers to information allowing a magnetic head to appropriately follow the data track in the magnetic recording medium 20. The servo burst includes a A burst in an area A and a B burst in an area B.

The A burst is disposed on a center line CL of each of the data tracks 26, and the B burst is disposed a distance half a track pitch from the A burst in a crosstrack direction. Each of the A burst and the B burst includes a plurality of burst pieces including first and second burst pieces P1 and P2, wherein the first and second burst pieces P1 and P2 have different sizes from each other. The first burst piece P1 is larger than the second burst piece P2 in size. The first burst piece P1 has smaller coercivity than the coercivity of the second burst piece P2. Such a burst pattern can be formed together with an array of bit dots which forms a data track, that is, each of the data tracks 26, when the magnetic recording medium 20 is fabricated. Meanwhile, the first burst piece P1 and the second burst piece P2 can be written to have opposite magnetization directions to each other by using a difference in coercivities. The pattern of the burst piece is substantially the same as the pattern of the burst piece which has been described with reference to FIG. 3. Thus, the pattern of the burst piece will not be described in detail. FIG. 11 illustrates an example of the servo burst, and the servo burst can have various structures.

A method of fabricating a magnetic recording medium according to the current exemplary embodiment will now be described in detail. First, an area to be magnetically recorded is patterned in a magnetic recording layer so that a plurality of data tracks and a servo burst pattern are formed in a magnetic recording medium. At this time, each data track is, as illustrated in FIGS. 9 and 10, a discontinuous array of bit dots each magnetically isolated in a downtrack direction and in a crosstrack direction. The servo burst is patterned in the magnetic recording layer such that bursts each having a plurality of burst pieces having different coercivities from each other are disposed in a zigzag structure along the downtrack direction, as illustrated in FIG. 11. According to the current embodiment, a length of burst pieces is adjusted to control their coercivity. However, as described above, the coercivity can also be controlled by adjusting the width of burst pieces in a crosstrack direction. The data track and the servo burst pattern can be formed at the same time. Such forming processes for the data track and the servo burst pattern are well known to those of ordinary skill in the art, and so, will not be described in detail.

A method of controlling a servo signal of a servo burst embedded in the magnetic recording medium according to the current embodiment will now be described in detail. As described above with reference to FIG. 11, a servo burst according to the current embodiment includes bursts each having a plurality of burst pieces having different coercivities from each other. Accordingly, burst pieces having different sizes from each other can have opposition magnetization directions to each other by being magnetized twice using magnetic fields having different intensities. Thus, a desired alternative signal can be written in the servo burst. The servo signal can be written in the same manner as described with reference to FIGS. 6 through 8, and thus, will not be described in detail.

As described above, various magnetic recording media have been described according to embodiments of the present invention. According to the exemplary embodiments of the present invention the respective bursts which form a servo burst include burst pieces have different coercivities so as to use a phenomenon that when a magnetic field having a weaker intensity than the coercivity of a magnetic material is applied to the magnetic material, the magnetization orientation of the magnetic material is not changed. Accordingly, other embodiments based on the sprit of the present invention described can also be realized without departing from the spirit and scope of the present invention.

Figure 12:
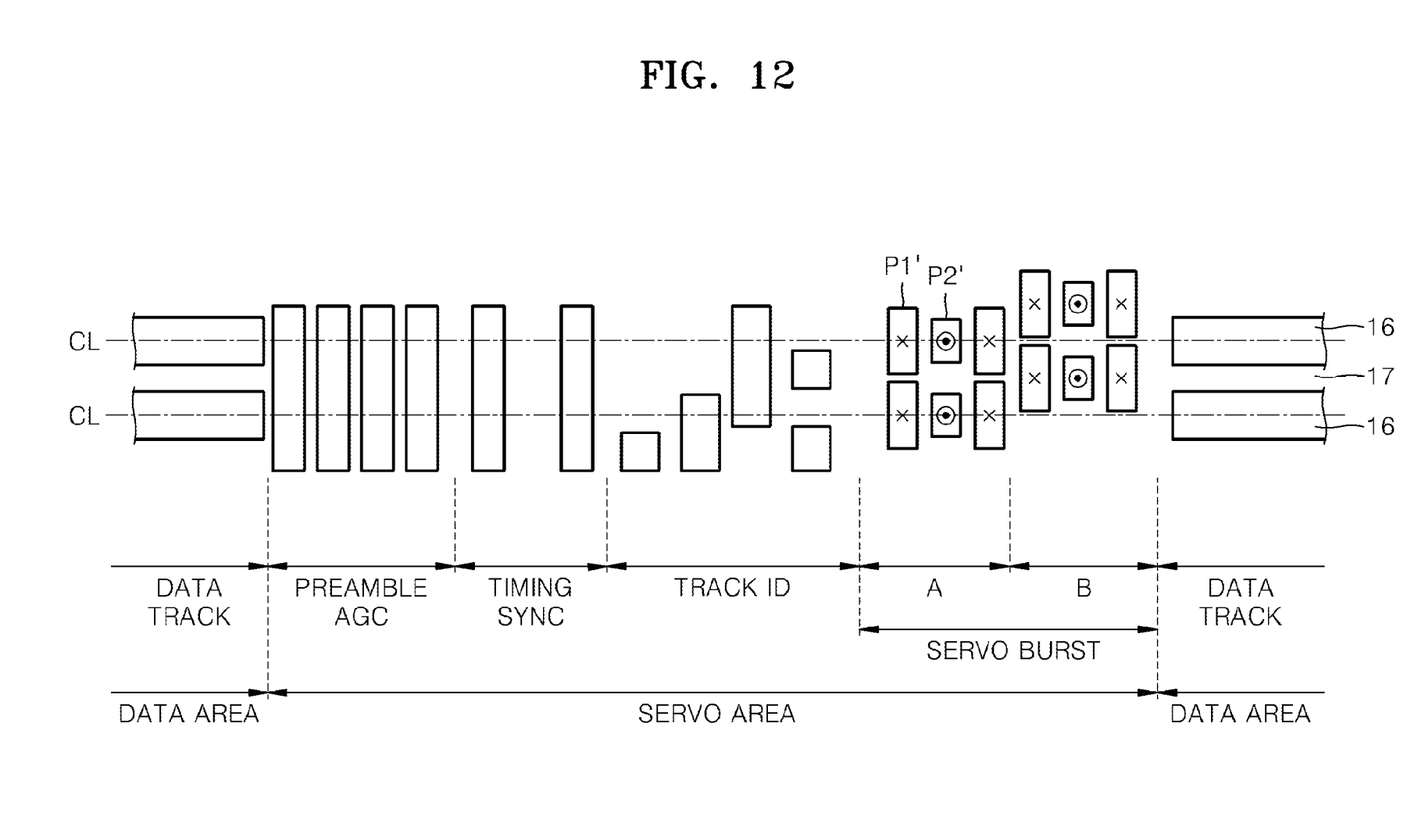
FIG. 12 is a schematic view of another example of a servo pattern formed in a servo area of the magnetic recording medium of FIG. 1.

For example, in previous embodiments, burst pieces have different sizes from each other by having differing lengths in a downtrack direction. However, the present invention is not limited thereto. For example, burst pieces P1', P2' can have different sizes from each other by differentiating their widths in a crosstrack direction as shown in FIG. 12. By differentiating between burst pieces using the dimensions described above, burst pieces can have different coercivities from each other. Thus, the coercivities of burst pieces can be adjusted using such a phenomenon.

According to previous embodiments, a servo burst includes a A burst disposed on the same line as each of the data tracks and a B burst disposed a distance half a track pitch from the data track in a crosstrack direction. However, the servo burst can further include other bursts having various patterns to quickly process servo signals. For example, the servo burst can include a C burst disposed a distance one fourth of a track pitch from the data track in the crosstrack direction, and a D burst disposed a distance three fourths of a track pitch from the data track in the crosstrack direction. The servo burst can also include A, B, C, and D bursts. In addition, the magnetic recording medium according to the present invention can include various servo burst patterns used in related art continuous medium.

As described above, a magnetic recording medium according to the present invention and a method of fabricating the same are suitable for a discrete track medium or a patterned medium. According to the present invention, burst pieces forming a burst are magnetized in different directions from each other so that the obtained signal becomes similar to an alternative signal written in a burst having a burst pattern used in a related art continuous medium. Thus, a servo signal process used in a related art continuous medium can be applied to a servo signal process of the present invention without requiring substantial modifications.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic recording medium in which a position for magnetic recording is patterned with a magnetic material, the magnetic recording medium comprising a magnetic recording layer which comprises:
   a data area having a plurality of data tracks, and
   a servo area having a servo burst for following the data tracks, wherein the servo burst comprises a plurality of bursts, and each of the bursts comprises a plurality of burst pieces having different coercivities from each other.

2. The magnetic recording medium of claim 1, wherein the burst pieces have different sizes from each.

3. The magnetic recording medium of claim 2, wherein the burst pieces have different lengths from each other in the downtrack.

4. The magnetic recording medium of claim 2, wherein the burst pieces have different widths from each other in a crosstrack direction.

5. The magnetic recording medium of claim 1, wherein each of the burst pieces stores a unit bit.

6. The magnetic recording medium of claim 5, wherein the burst pieces are magnetized in an upward direction or a downward direction.

7. The magnetic recording medium of claim 1, wherein each of the burst pieces comprises a first burst piece having a first coercivity and a second burst piece having a second coercivity, wherein the first coercivity and the second coercivity are of different values.

8. The magnetic recording medium of claim 1, wherein the servo area further comprises a pre-burst area in which pre-burst information is written.

9. The magnetic recording medium of claim 8, wherein the pre burst information comprises at least one of a preamble, a timing sync, and a track ID.

10. The magnetic recording medium of claim 1, wherein the data tracks are magnetically separated in a crosstrack direction and continuous in a downtrack direction.

11. The magnetic recording medium of claim 10, wherein a separation area which magnetically separates the data tracks is empty or is filled with a nonmagnetic material.

12. The magnetic recording medium of claim 1, wherein the data tracks are formed of a plurality of non-continuous magnetic bodies which are magnetically separated in a crosstrack direction and a downtrack direction.

13. The magnetic recording medium of claim 12, wherein one bit is assigned to each of the non-continuous magnetic bodies.

14. The magnetic recording medium of claim 13, wherein a separation area which magnetically separates the non-continuous magnetic bodies is empty or is filled with a nonmagnetic material.

15. A method of fabricating a magnetic recording medium in which a plurality of data tracks and a servo burst for following each of the data tracks are embedded in a magnetic recording layer, the method comprising:
   patterning the magnetic recording layer to form a location to be magnetically recorded, thereby forming a plurality of data tracks;
   patterning bursts each having a plurality of burst pieces having different coercivities from each other in the magnetic recording layer;
   applying a first magnetic field to the servo burst so that all of the burst pieces of the servo burst are magnetized in a first direction, the first magnetic field having a stronger intensity than coercivities of the burst pieces; and
   applying a second magnetic field in a second direction to the servo burst which has been magnetized in the first direction, the second magnetic field having a weaker intensity than coercivities of first burst pieces among the plurality of burst pieces but having a stronger intensity than coercivities of second burst pieces among the plurality of burst pieces, wherein burst pieces having smaller coercivity than the intensity of the second magnetic field are magnetized in the second direction.

16. The method of claim 15, wherein the data tracks and the servo burst are formed at the same time.

17. The method of claim 15, wherein in the forming of the servo burst, the burst pieces have different sizes from each other.

18. The method of claim 17, wherein in the forming of the servo burst, the burst pieces have different lengths from each other in the downtrack direction.

19. The method of claim 17, wherein in the forming of the servo burst, the burst pieces have different widths from each other in a crosstrack direction.

20. The method of claim 15, wherein in the forming of the servo burst, each of the first burst pieces has a first coercivity and each of the second burst pieces has a second coercivity which is different from the first coercivity.

21. The method of claim 15, wherein in the applying of the first magnetic field, all of the burst pieces of the servo burst are magnetized in an upward direction or a downward direction.

22. The method of claim 15, wherein in the applying of the second magnetic field, the burst pieces having smaller coercivity than the intensity of the second magnetic field are magnetized in the second direction which is opposite to the first direction.

23. The method of claim 15, wherein in the forming of the data tracks, the data tracks are magnetically separated in a crosstrack direction and continuous in the downtrack direction.

24. The method of claim 15, wherein in the forming of the data tracks, the data tracks are magnetically separated in the downtrack direction and in a crosstrack direction.

* * * * *